United States Patent [19]
Woodside

[11] Patent Number: 5,389,247
[45] Date of Patent: Feb. 14, 1995

[54] WASTE WATER TREATMENT PROCESS

[76] Inventor: Arthur G. Woodside, 60 Birdie Dr., Slidell, La. 70460

[21] Appl. No.: 894,665

[22] Filed: Jun. 5, 1992

[51] Int. Cl.⁶ .............................................. C02F 3/06
[52] U.S. Cl. ..................................... 210/151; 210/205
[58] Field of Search ............... 210/150, 610, 651, 205; 261/94, 95, 100, 101

[56] References Cited

U.S. PATENT DOCUMENTS

| | | | |
|---|---|---|---|
| 3,238,124 | 3/1966 | Burton | 210/3 |
| 4,137,171 | 1/1979 | Yokata | 210/150 |
| 4,165,281 | 8/1979 | Kuriyama et al. | 210/17 |
| 4,229,386 | 10/1980 | Lerner | 261/98 |
| 4,294,694 | 10/1981 | Coulthard | 210/150 |
| 4,416,993 | 11/1983 | McKeown | 435/243 |
| 4,422,930 | 12/1983 | Hatanaka | 210/150 |
| 4,530,763 | 7/1985 | Clyde et al. | 210/610 |
| 4,717,519 | 1/1988 | Sagami | 264/103 |
| 4,758,453 | 7/1988 | Challet et al. | 428/36 |
| 4,908,128 | 3/1990 | Chiba | 210/150 |

Primary Examiner—Frank Spear
Attorney, Agent, or Firm—John E. Benoit

[57] ABSTRACT

An apparatus for treating waste water in which a series of filtering pads are formed by a plurality of offset nets made from ribbon-like lines having a multitude of ringlets. The nets are mounted in planar configuration within a frame at spaced intervals, with the plane of the nets being supported at an angle of 40° to 50° from the horizontal. The frames may be placed in any water system such as fabricated basins, ponds, ditches, rivers or lakes. Also, one or more of the netted frames may be placed in a basin for anaerobic treating organic waste water. Water circulation means are fixed within the tank for repetitive flow through the filtering pads and the delivery of oxygen and/or other process elements.

9 Claims, 8 Drawing Sheets

WASTE WATER TREATMENT PROCESS

This invention relates generally to waste water treatment apparatus and more specifically to a true filtering bed configuration including fluid recirculation through the beds. This system entraps substantially all process elements and provides a favorable processing environment resulting in substantially complete biodegradation of all waste.

BACKGROUND OF THE INVENTION

At the present time, the most prominent method for the catalytic oxidation of organic waste water is in a waterfilled basin media. Various modifications of this method have been made from time to time, with the object being to shorten the period of bringing the process elements together (microorganisms/waste materials/oxygen) and improving the environment in which they all perform. Most of such modifications have been classed as dipping filter beds or contact media in such forms as corrugated or flat plates 93 (FIG. 1) in basin 45, or rotating biological contactors 97 (FIG. 2) in basin 45. These contactors rotate with the lower half in the waste water and the upper half in the air. Although these media do remove and hold one or more of the process elements from the fluid, they do it by a contact action rather than a filtering action which connotes passing the fluid through the media in order to separate or remove the particles. Accordingly, the term media will be used in subsequent discussions unless a filtering action is actually performed. One of the important aspects in this type of system is to avoid impeding the flow of the process and the aeration. To this end, the contact media material is oriented in both the vertical and longitudinal flow directions so that its surface contact area is in a plane parallel to the flow and it is also spaced sufficiently far apart to permit free flow of the waste materials and air between the members. This results in a system wherein the contact media material forms a relatively small percentage of the volume of the water basin.

A more recent contact media design uses a large number of ribbon-like contact members consisting of a synthetic fiber, with the fibers having a large number of fluffs or loops projecting therefrom. This system, indicated at 91 in FIG. 1, extends the ribbon-like contact members in a vertical direction. In one particular usage the ribbons are extended between upper and lower frame members so as to create a sinusoidal line of ribbons as they move to successive frames, with the sinusoidal lines lying in a plane. As with other contact media, this arrangement of sinusoidal ribbons forms a vertical plane parallel to the flow path of the process and air which is spaced sufficiently far apart from adjacent sinusoidal lines to permit the free flow of the waste material and air. As will be obvious, the total amount of the ribbons consumes a small percentage of the volume of the water basin.

The basic function of these types of contact media is to provide a surface to which the microorganisms can attach and then catch the random wandering waste material and air so that the biodegradation process can be accomplished in the shortest possible time and to the fullest extent possible.

Although each of the above-discussed installations has achieved a certain level of success, there are disadvantages in each of them which results in the fact that they do not provide the optimum level desired. Such disadvantages will be discussed below.

The installation, which contains the plane of the contact media parallel to the flow of the process, provides only a brushing, bumping, bouncing contact of the waste material and air, with no positive entrapping action.

Additionally, the spacing between the planes of the contact media and the small volume in relation to the total volume of the basin results in the contact media interacting with only a relatively small percentage of the random wandering process elements and only those directly adjacent to the media. A large percentage of the biodegradation continues to be conducted in the fluid.

Although these systems are designated as filter beds, the fact is that little filtering action is accomplished as the process moves from the influent to the water basin to its exit.

Accordingly, it is the object of the present invention to provide an apparatus which is a true filter bed/pad which will hold the microorganisms and entrap all of the waste material, together with the necessary air/oxygen and/or other process elements, and where a favorable environment is formed in which total biodegradation can be accomplished on all the waste material.

SUMMARY OF THE INVENTION

The present invention provides a dipping filter bed using a plurality of ribbon-like lines having a multitude of ringlets fabricated from a high-tensile strength environment and formed into a netting having crossed lines so as to provide a mesh. The nets are installed on a frame/scaffold so as to extend at a predetermined angle, preferably between 40° and 50° from the bottom of the tank. To provide filtering in both the vertical and longitudinal process flow directions, a plurality of these nets are spaced apart a predetermined distance parallel with each other. Further, the nets are offset, one with the next, a predetermined amount in the lateral direction to the process so that the corresponding vertical lines for a series of nets form a filter pad, and following similar groupings of nets form successive filter pads, with all lines and nets being sufficiently spaced to afford a completely free flow with no limitations or restrictions. The waste material and other process elements are delivered either evenly alongside the full length of the net/scaffolding framework or evenly in batches between successive modules of the net/scaffolding, which together comprise the total scaffolding framework. Means are provided for causing the fluid to pass through the series of filter pads on a recirculating schedule. Such means can be air input sources, motor-driven impellers, or agitators to push the waste material to the bottom and then flow it back up through the filter pad.

DETAILED DESCRIPTION OF PREFERRED EMBODIMENTS

Figure 1:
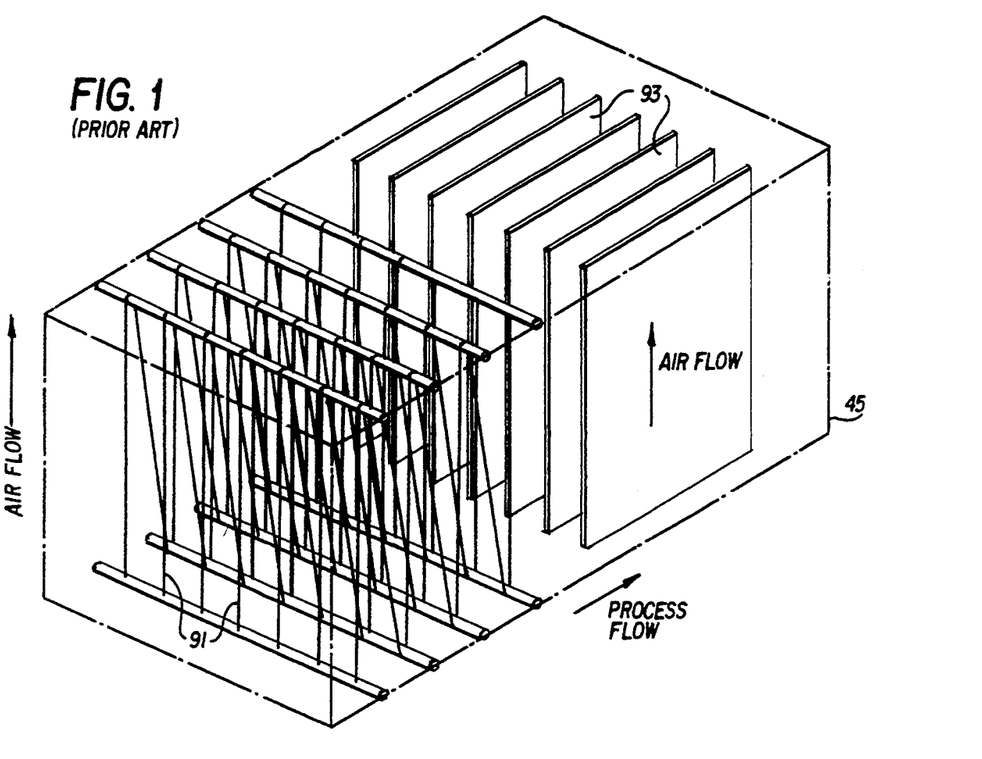
FIG. 1 is a schematic representation of two prior art water treatment systems.
Figure 2:
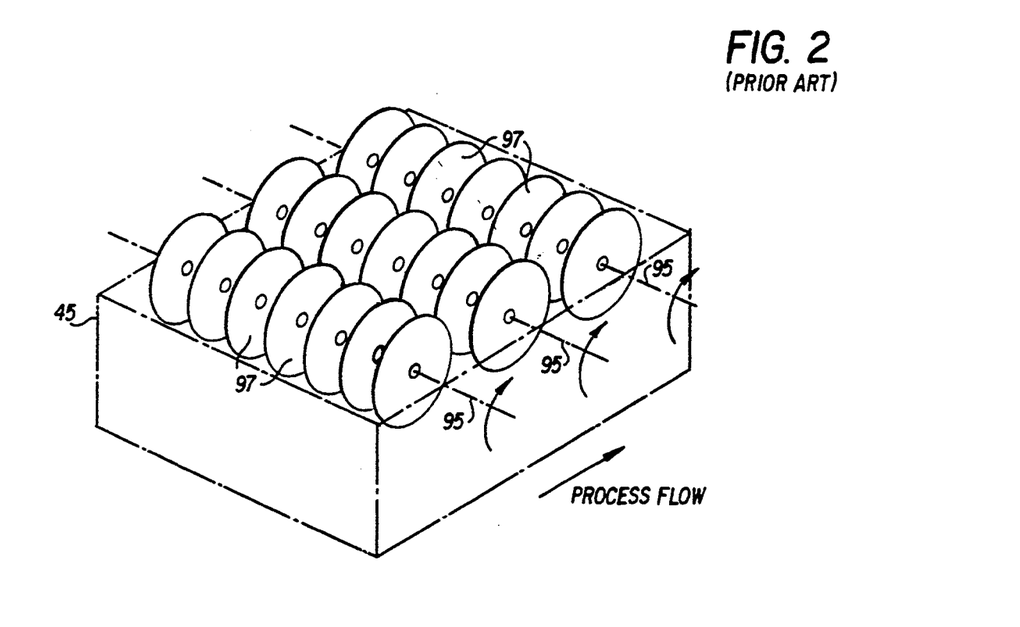
FIG. 2 is a schematic diagram of a further prior art system.

The prior art systems shown in FIGS. 1 and 2 have been described in the background discussion above.

Figure 3:
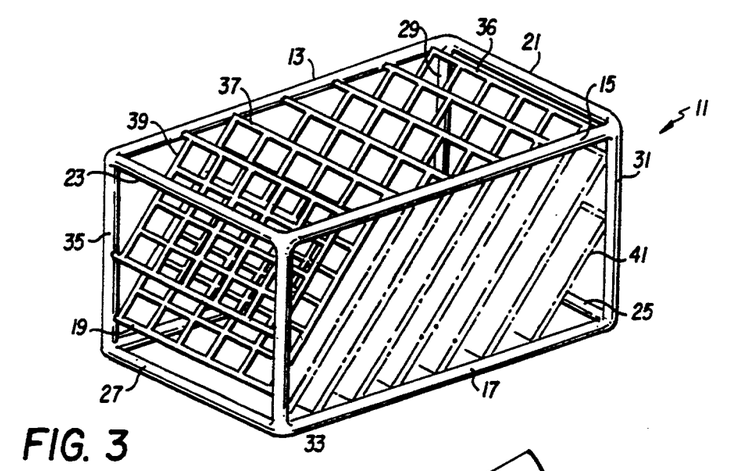
FIG. 3 is a schematic representation of a frame having mounted therein the nets of the present invention.

Referring to FIG. 3, there is shown a basic module 11 of the present invention which includes a frame comprised of rods or tubing, including the horizontal rods 13, 15, 17 and 19, 21, 23, 25, and 27, the horizontal rods being connected to vertical rods 29, 31, 33, and 35. It is to be understood that additional horizontal and/or vertical rods can be used for support of the netting. In this particular configuration, this forms a substantially rectangular module. Other module configurations could be used, such as square, pie-shaped, circular, etc. to conform to round or odd-shaped water basins.

Secured within the module are a series of nets 37 which are secured in any desired fashion between the upper horizontal rods 13 and 15 and lower horizontal rods 17 and 19. Each of the nets is secured so as to lie in a substantially planar configuration and at an angle to the horizontal rods, as will be discussed in more detail as the description proceeds. It is noted that the horizontal lines of the net position and hold the vertical lines of the net in a predetermined position with each other and determine the positioning with succeeding nets. In order to completely fill the module to obtain the best results, smaller netting 39 and 41 may also be secured as shown.

Figure 4:
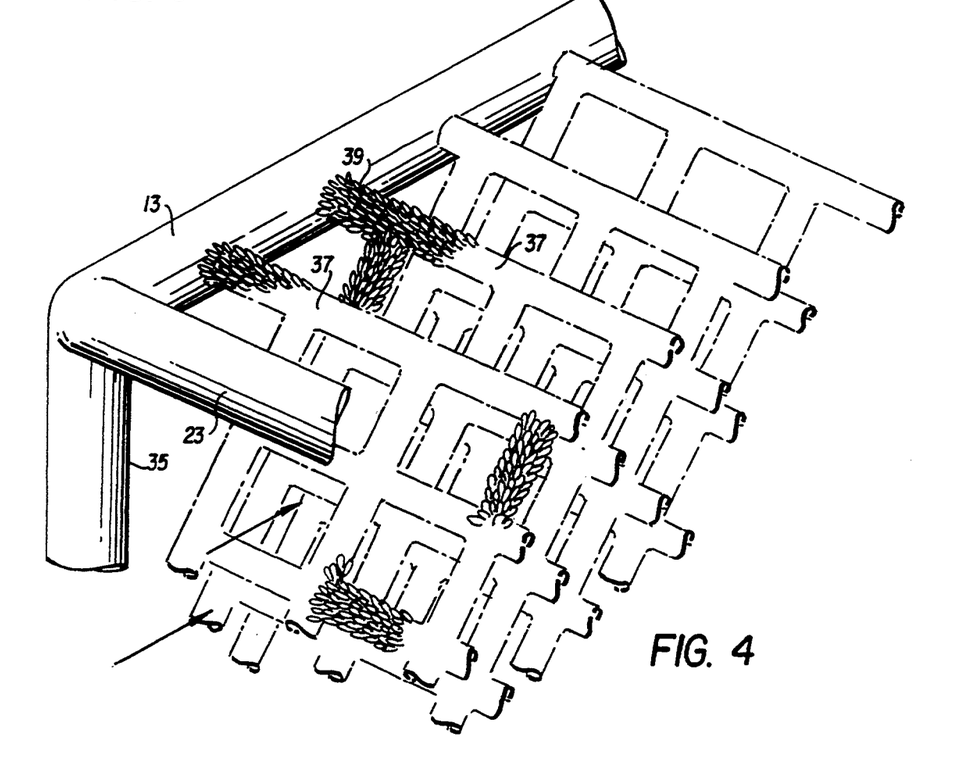
FIG. 4 is a partial sectional view of a corner of the frame of FIG. 3, more closely illustrating the web formation and further illustrating the structure of the ribbon-like material.

Referring to FIG. 4, there is shown a schematic illustration of a partial section of a corner of the module of FIG. 3, indicating the netting having horizontal and vertical lines and further indicating that the netting is comprised of ribbon-like lines having a multitude of ringlets 39. These lines are fabricated from a high-tensile strength environment-proof thread and are available commercially from a source such as the Kajima Corporation of Japan.

Figure 5:
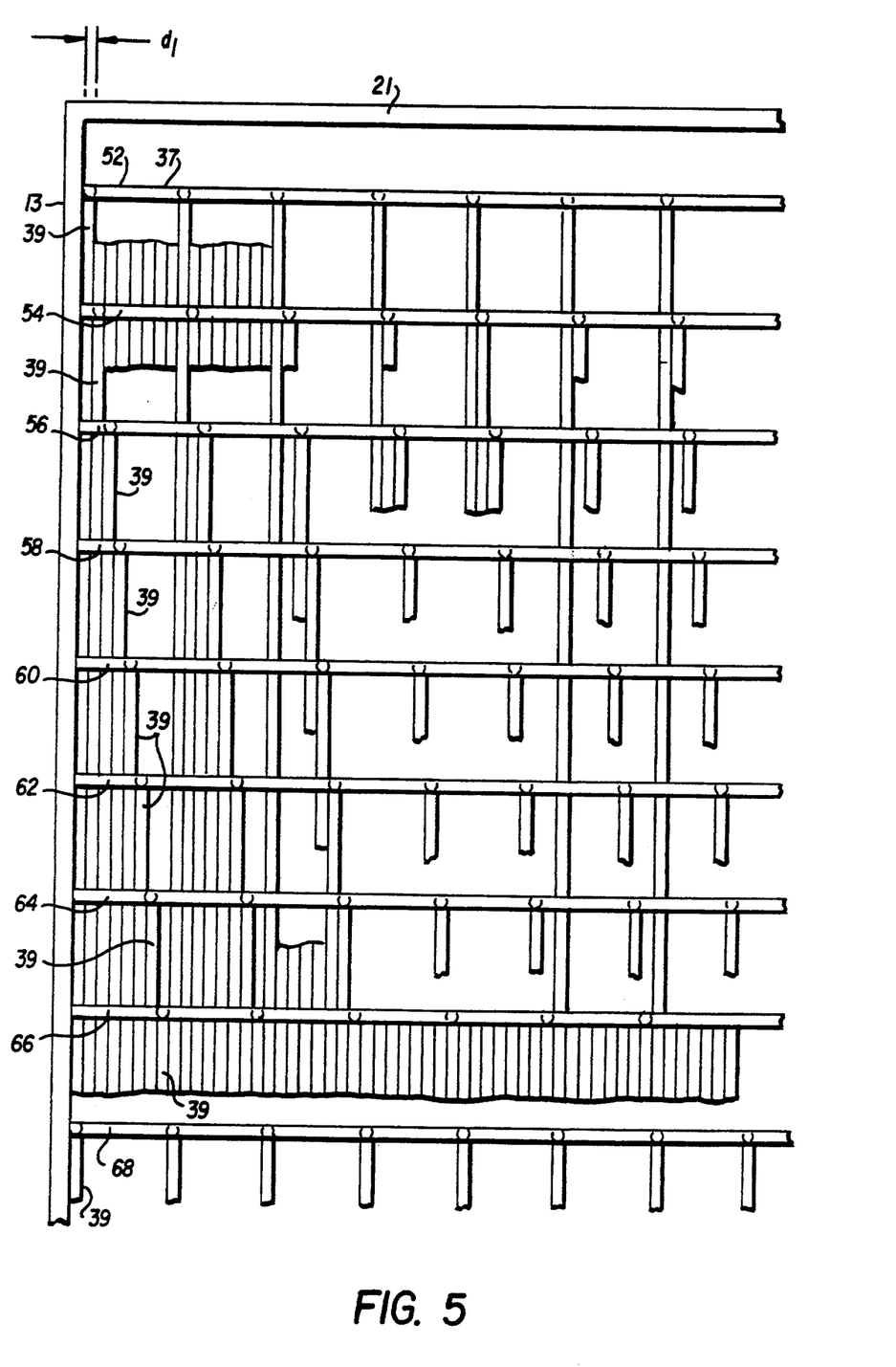
FIG. 5 is a partial top plan view of the apparatus of FIG. 3 showing the offset feature of the netting and the filter pad configuration.

FIG. 5 is a partial top view showing the nets of FIG. 3, illustrating that the downwardly extending vertical members are offset from each other when viewed along the lines from one end of the module to the other. The nets 52, 54, 56, 58, 60, 62, 64, and 66 represent one filter pad assembly. Net 52 begins with its first vertical line 39 at a d1 distance of 0.5 inch relative to horizontal rod 13. In a nominal installation the nets will have a four-inch mesh and a line diameter of 0.5 inch. The first line 39 of succeeding nets 54, 56, 58, 60, 62, 64, and 66 are offset an additional 0.5 inch with respect to the former so as to fill all spaces to form a complete filter pad at net 66.

Referring to FIG. 4 and correlating with FIG. 3, it is shown that the openings between nets 52 and 64 are filled by lines from previous nets 38, 40, 42, 44, 46, 48, and 50 so that a completed FIG. 3 would show all spaces as viewed filled, resulting in a total filter pad.

A second group of successive nets beginning with 68 and similarly supported by nets 54, 56, 58, 60, and 62 would form a second filter pad configuration. While a bottom view has not been shown, it is clear from FIGS. 3 and 4 that a secondary filter pad configuration is formed by the horizontal staggered crossing lines of the net. In the configuration as shown, the horizontal net lines maintain the position of the vertical net lines relative to each other.

Figure 6:
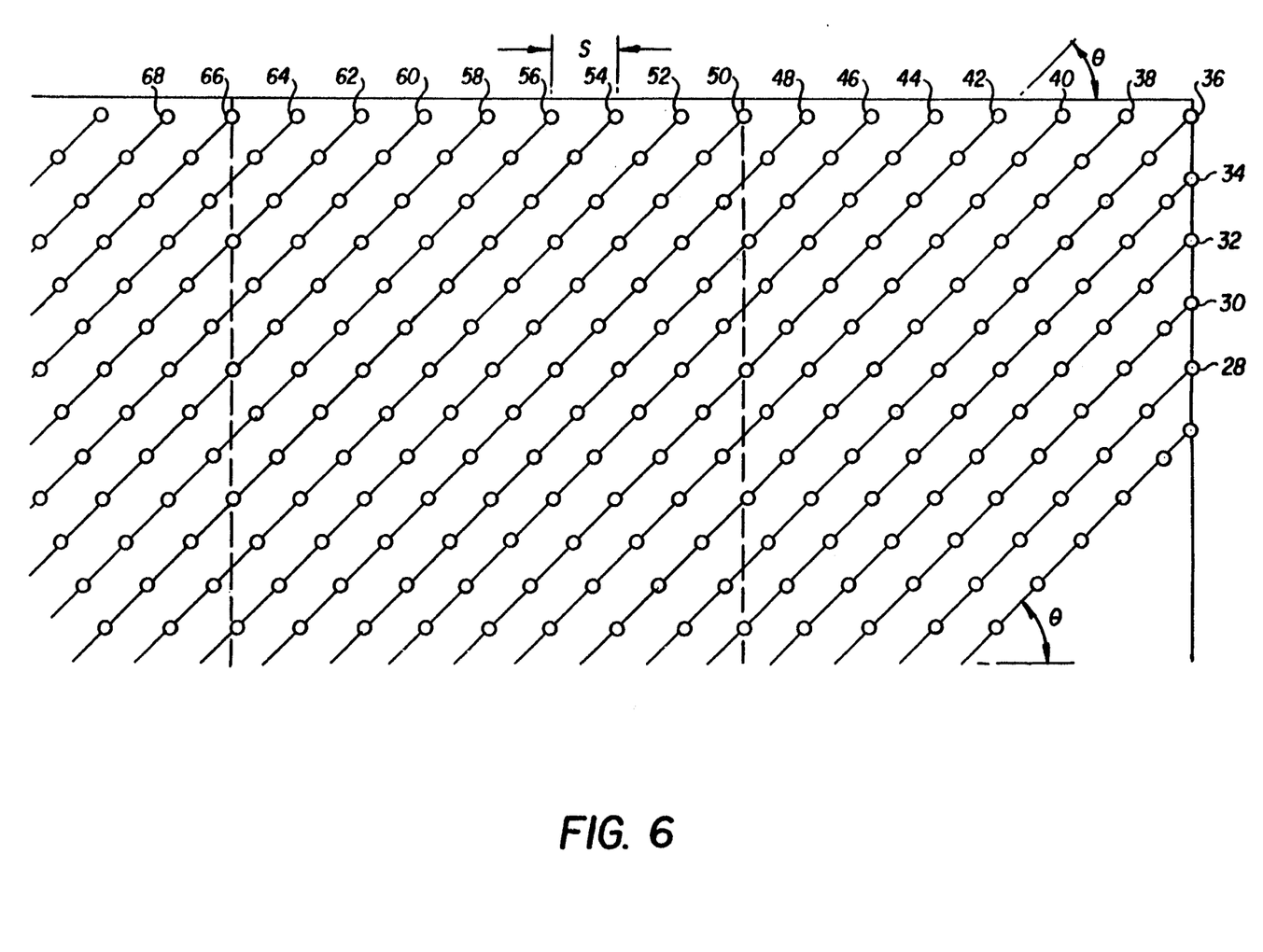
FIG. 6 is a partial sectional side view of the apparatus of FIG. 3 indicating the spacing between the nets, the angle of the nets relative to the horizontal member of the frame, and the nets involved in the FIG. 5 top plan view.

FIG. 6 is a sectional elevational view of a plurality of the nets shown in FIG. 3 and illustrates the spacing between the nets as they are secured to horizontal bar 13 and also indicates that the individual nets are strung in a planar fashion at an angle e to the plane of horizontal bar 13. Preferably, this angle is between 40° and 50° and, in a preferred embodiment, the angle is 45° and the spacing is 4.0 inches. This angle provides that the complete process flow, both vertical and longitudinal, is exposed to and passes through the filtering pads. The vertical cut between nets 50 and 66 shows the nets and lines as viewed by FIG. 3.

With the arrangement of nets as discussed above, the horizontal/lateral net lines will be offset but yet substantially adjacent so as to provide a secondary filter pad configuration for vertical flow.

As will be obvious from the schematic illustrations of FIGS. 3–6, all waste fluid will be subject to the filtering action of the nets; and since the lines are no closer to each other than a nominal four inches, there are no limitations or restrictions to a completely free flow.

Figure 7:
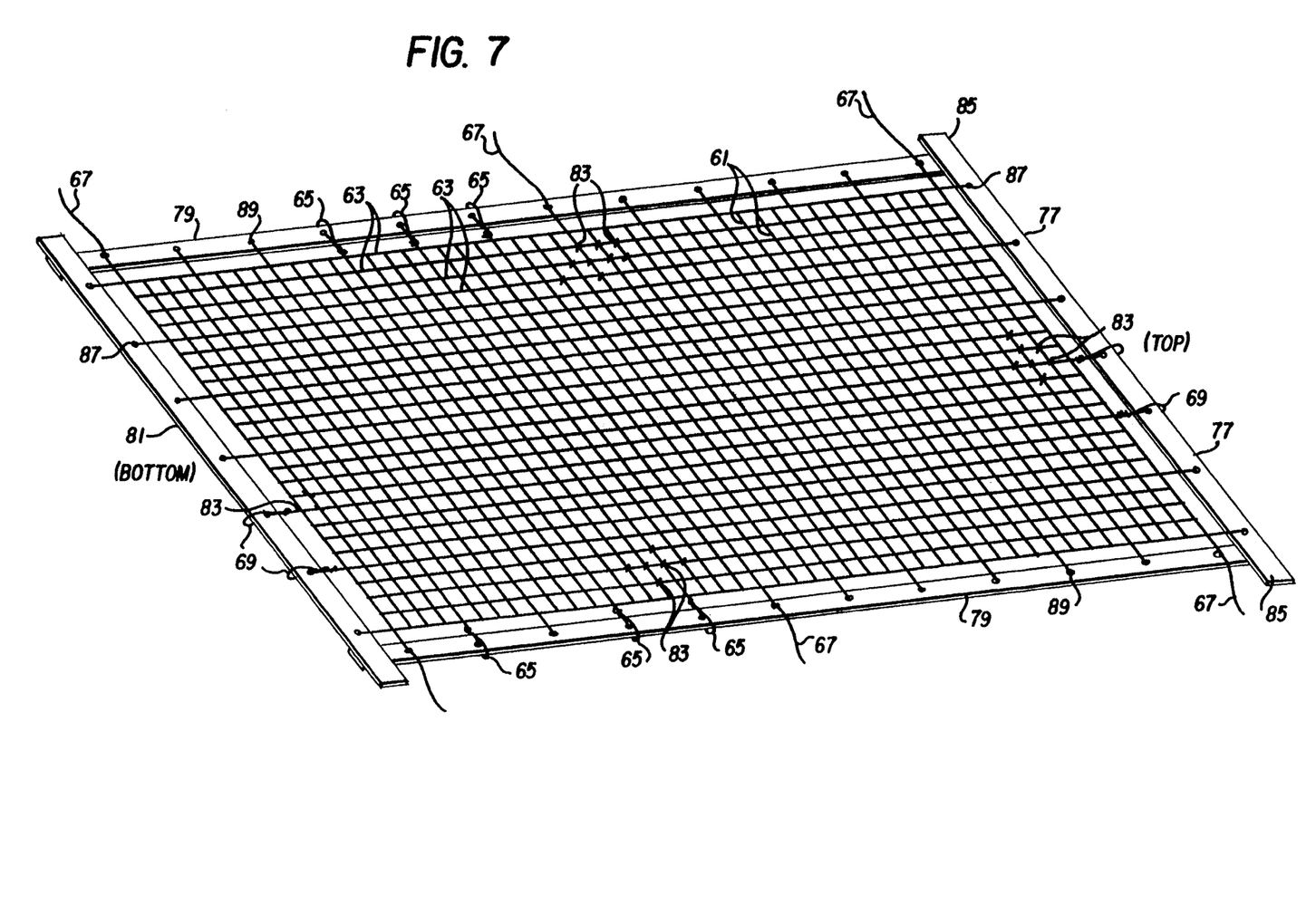
FIG. 7 is an illustration of one embodiment of a net formed from the fibers shown in FIG. 4.

FIG. 7 is a schematic diagram of the embodiment of one net assembly wherein there are a plurality of vertical ribbons 63 and a plurality of horizontal ribbons 61. The horizontal and vertical ribbons are firmly secured together at crossing points by means such as electrical cabling ties 83. In one construction of the preferred embodiment, the net is fabricated on the basis of a 4-inch mesh having a total of 34 horizontal ribbon-like lines and 24 vertical ribbon-like lines to provide a compact and workable structure. A selected number of the vertical ribbon-like lines terminate in tails 69 which loop through holes 87 in the nets top bounding piece 77 and bottom bounding piece 81 and return to be tightly drawn and anchored to themselves by means such a high-tensile strength environment-proof electrical cabling ties 83. A selected number of the horizontal ribbon-like lines terminate in tails 65 which loop through holes 89 in the nets side-bounding pieces 79, and then return and tightly bind to themselves by means such as electrical cabling ties 83. The top, middle, and bottom horizontal ribbon-like lines terminate in longer tails 69 which loop through their respective holes 89 and then may be used to attach the entire net to the rods 13, 15, 17, and 19 of FIG. 1 and any similar intermediate frame members. In order to prevent the ties from slipping along the rails, any means can be used such as pegs integral with or extending from the rods at fixed intervals, clamps, or even special fittings attached to or positioned on the rods and to which the top bounding piece bars 85 may be inserted. Bounding pieces may be constructed from an environmental-proof material such as PVC.

While the nets shown in FIG. 7 can be constructed and furnished as shown, there may be certain advantages in being able to handle the equipment at the site for final assembly so that storing and transportation is greatly simplified. In such a case, the nets may be fabricated without the bounding pieces and then can be assembled at the site; however, certain applications may favor installation without one or more of the bounding pieces.

Figure 8:
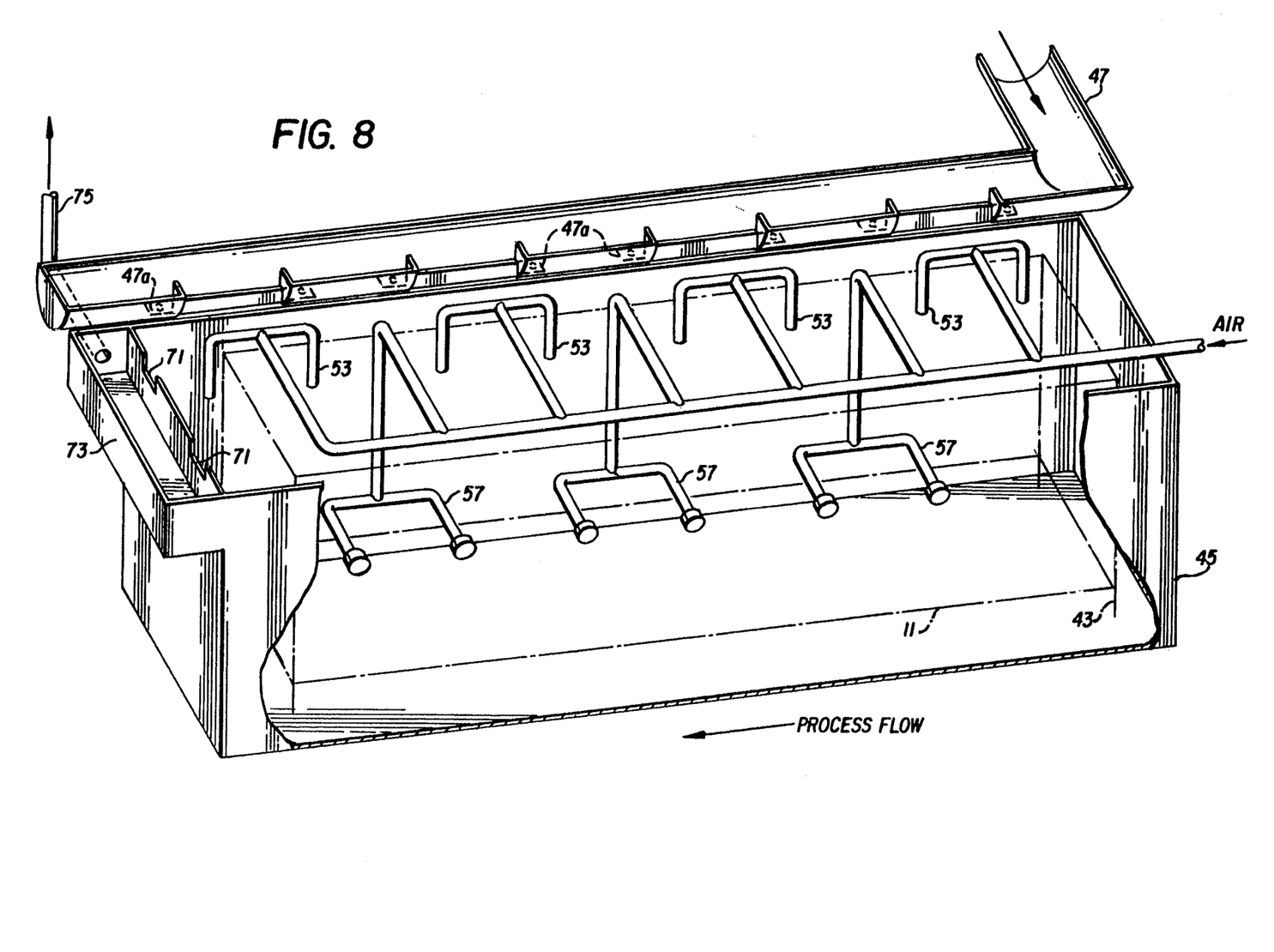
FIG. 8 is a schematic diagram of one embodiment of an aerobic waste tank used with the present invention.

Referring to FIG. 8, a typical rectangular water basin 45 is schematically shown which may be of a dimension of a few feet to several hundred feet long. A nominal width of such a tank is 8–10 feet with a water depth of 8–10 feet. These nominal widths and depths have evolved from dimensions which optimize the air process used in these tanks. Wider basins will generally be double such nominal width and use dual air systems. The depths remain substantially unchanged in these systems.

The present invention contemplates equal performance by all filter pad configurations, which should require equal delivery of the waste material and other process elements. Delivery trough 47 provides for a substantially even delivery for the length of the basin. Adjustable weirs 47a provide for any needed adjustments. Air downcomers 53 are installed in the area of the waste material delivery. They provide a downward motion of the waste material to provide a circulation and recirculation path through the filtering pads while adding air/oxygen to the waste, the fluid, and the filter pad at the same time.

One type of an accepted side delivery of air to the process is shown as manifold and diffuser 57. This arrangement bubbles additional air/oxygen into the waste, the fluid, and particularly the filtering pads formed by the nets, while at the same time continuing the recirculation of all process elements through the filtering pads, where complete biodegradation is accomplished.

As shown by the arrow, the process flows from right to left, as seen in the drawings, and the biodegraded effluent flows over weirs 71, into collecting trough 73, and thence out through piping 75 to the next stage of the process. The system shown in FIG. 8 is arranged to function with one module, as indicated in FIG. 1.

Figure 9:
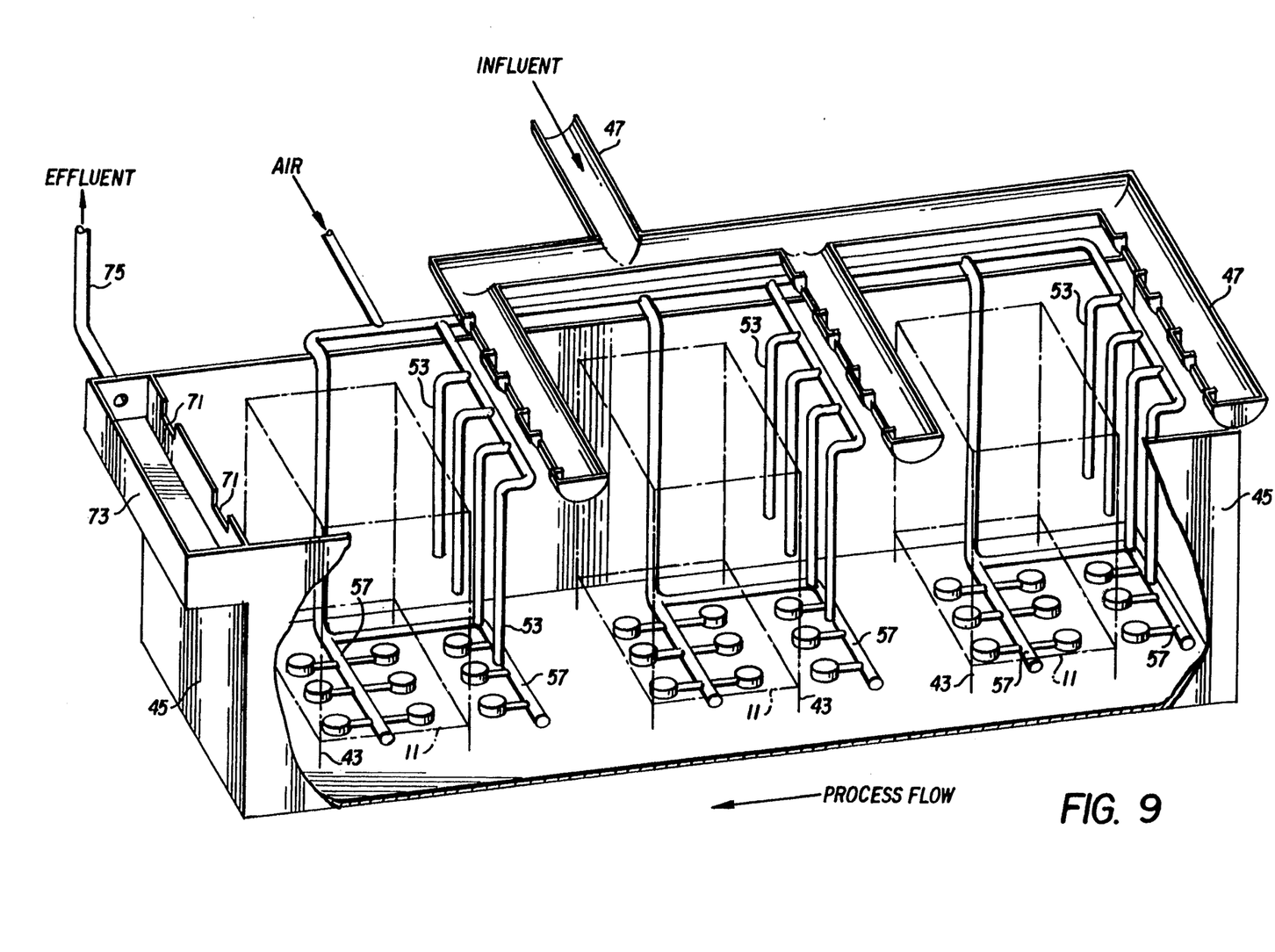
FIG. 9 is a schematic diagram of one embodiment of the invention showing an assembly of nets and associated aeration apparatus with an aerobic waste tank.

FIG. 9 discloses a further embodiment using a different water basin arrangement wherein several of the modules as shown in FIG. 1 are installed. This water basin 45 can also be very long, with its height being 8–10 feet, as in the arrangement of FIG. 7. In this arrangement, however, the width can be any width that is desired within reason. Waste material and other process elements are delivered evenly by troughs 47 across the width of the water basin to each module. Air downcomers 53 are installed across the basin and in the areas of the waste material deliveries. They perform the same function as described above relative to FIG. 8; that is, they force a downward motion of the process elements in the beginning of the recirculation action through the filter pads formed by the nets.

The manifold and diffuser arrangement 57 is installed on the bottom of the water basin and the full length and width of each module 11. This air delivery configuration also bubbles air/oxygen into the waste, the fluid, and particularly the filtering pads, while at the same time continuing the recirculation flow of all process elements through the filtering pads. The configuration as shown in FIG. 9 provides an air delivery arrangement which can accommodate water basins with widths greater than 8–10 feet, as well as odd-shaped water basins (ponds, ditches, rivers, round, oblong, etc.). The process flow as shown by the arrow is from right to left, where the ultimate biodegraded effluent flows over weir 71, into trough 73, and out through pipes 75 to the next stage.

Figure 10:
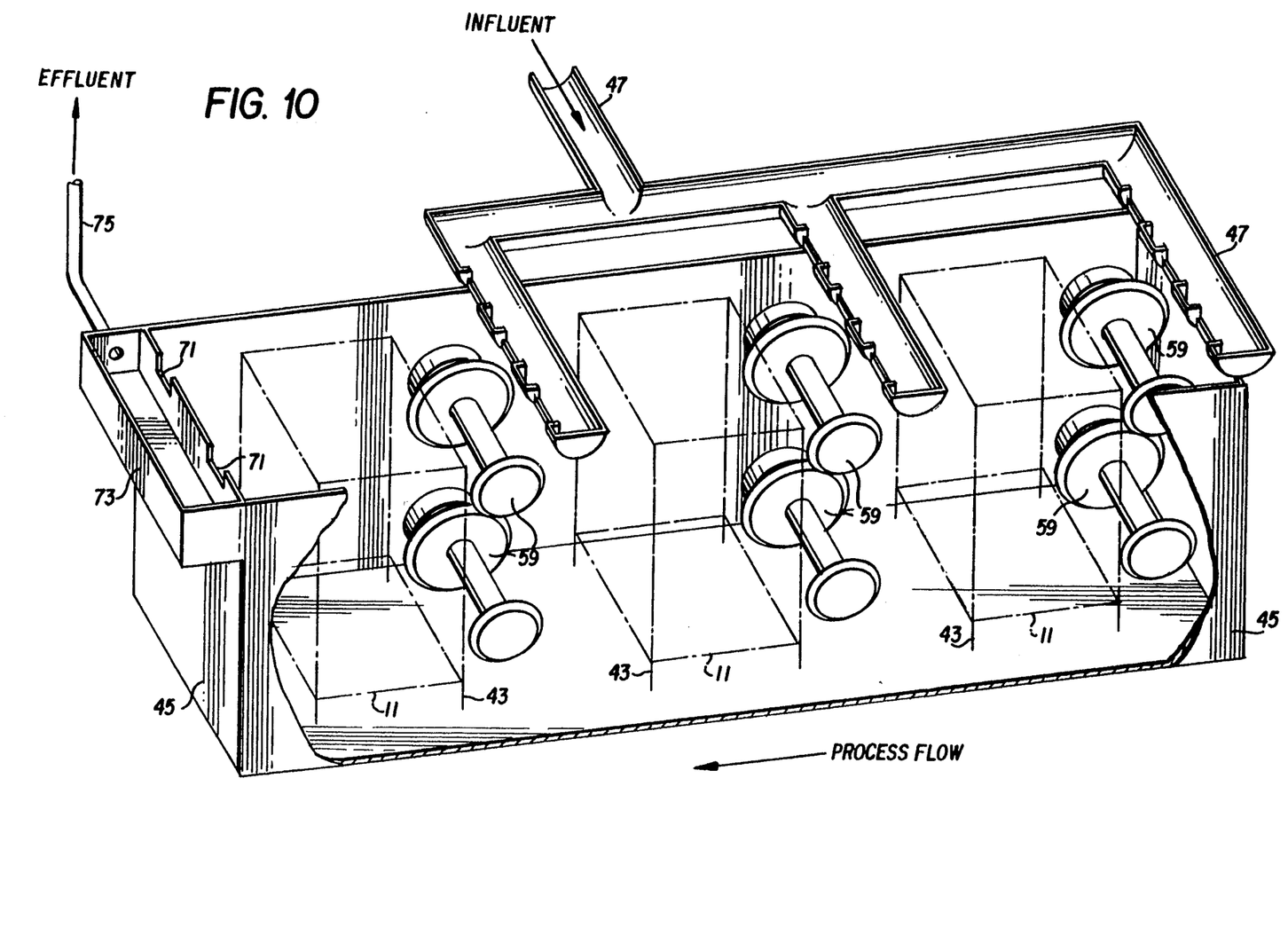
FIG. 10 is a schematic diagram of a further embodiment of the invention showing the assembly of nets with an anaerobic tank.

FIG. 10 is a configuration for an anaerobic process where air/oxygen is not used in the process. This system will generally be the same as in FIG. 9 except that no air will be used and one or more mechanical fluid movers 59 such as motor-driven impellers will be used to circulate the process elements through the filtering pads, where the waste will be biodegraded and delivered out through pipes 75.

As will be obvious from the schematic illustrations of FIGS. 3–10, all waste material, microorganisms, and other process elements are subject to entrapment in the filter pads, where they are locked together so that complete biodegradation can take place.

The basic module of the present invention may be placed in any fluid environment such as rivers and lakes, where natural currents cause the fluid to pass through and can be filtered by the netting.

The above description and drawings are illustrative only since equivalent components could be used without departing from the invention, which is to be limited only by the scope of the following claims.

I claim:

1. Apparatus for treating waste water comprising
    a plurality of nets consisting of crossing ribbon-like lines having a multitude of ringlets, said lines being fabricated from a high-tensile strength environment-proof thread;
    a frame having substantially horizontal and vertical interconnected rods;
    means for mounting each of said plurality of nets in a substantially planar-spaced configuration within said frame, the plane of said nets being at an angle of between 40° and 50° to said horizontal rods; and
    a tank for receiving organic waste water, said tank being of a dimension for receiving at least one of said frames.

2. The apparatus of claim 1 wherein said nets are at an angle of 45° to said horizontal rods.

3. The apparatus of claim 1 further comprising means for circulating the water in said tank.

4. The apparatus of claim 1 further comprising means for substantially evenly distributing waste material and other process elements to said nets.

5. The apparatus of claim 1 wherein each of said nets comprises
    a first set of spaced ribbon-like lines;
    a second set of spaced ribbon-like lines intersecting said first set of lines; and
    means for attaching said first and second sets of line at each point of intersection.

6. The apparatus of claim 1 further comprising
    a selected number of lines extending beyond each of said nets, said extended lines being used to secure said nets to said frame.

7. The apparatus of claim 3 wherein said means for circulating said water comprises
    air inlets for introducing air under pressure into said tanks.

8. The apparatus of claim 3 wherein the means for circulating said water comprises
    a motor-driven impeller within said tank.

9. The apparatus of claim 1 wherein adjacent nets are laterally offset from each other so as to form a filtering pad configuration.

* * * * *